(12) United States Patent
Shioi et al.

(10) Patent No.: US 8,561,571 B2
(45) Date of Patent: Oct. 22, 2013

(54) APPARATUS AND METHOD OF APPLYING A COATING SOLUTION

(75) Inventors: Takafumi Shioi, Matsusaka (JP); Tadaaki Nakano, Matsusaka (JP); Shigeo Hamaguchi, Matsusaka (JP); Yoshinori Akamatsu, Matsusaka (JP); Nobuyuki Itakura, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 380 days.

(21) Appl. No.: 12/865,282

(22) PCT Filed: Jan. 21, 2009

(86) PCT No.: PCT/JP2009/050871
§ 371 (c)(1),
(2), (4) Date: Jul. 29, 2010

(87) PCT Pub. No.: WO2009/098940
PCT Pub. Date: Aug. 13, 2009

(65) Prior Publication Data
US 2010/0310778 A1    Dec. 9, 2010

(30) Foreign Application Priority Data

Feb. 8, 2008  (JP) ................................. 2008-028826
Apr. 7, 2008  (JP) ................................. 2008-099303

(51) Int. Cl.
*B05C 11/00*  (2006.01)
*B05B 7/06*  (2006.01)
*B05B 3/00*  (2006.01)

(52) U.S. Cl.
USPC ........... 118/686; 118/313; 118/315; 118/712; 118/323; 118/681; 118/684; 118/665

(58) Field of Classification Search
USPC ......... 118/313–315, 324, 305, 307, 323, 712, 118/713, 679, 681, 687, 688, 663, 665, 684, 118/686; 427/424
See application file for complete search history.

(56) References Cited

U.S. PATENT DOCUMENTS

| 5,534,067 A | * | 7/1996 | Fulker et al. ................. 118/681 |
| 5,776,545 A | | 7/1998 | Yoshiba et al. |
| 2004/0222323 A1 | | 11/2004 | Akasaka et al. |

FOREIGN PATENT DOCUMENTS

| CN | 1582202 A | 2/2005 |
| CN | 1970167 A | 5/2007 |

(Continued)

OTHER PUBLICATIONS

Computer Translation of JP-1099747; Apr. 21, 1998.*

(Continued)

*Primary Examiner* — Yewebdar Tadesse

(57) ABSTRACT

A method of applying a coating solution onto an upper surface of a glass plate that is transported in a substantially horizontal attitude, according to the first aspect of the present invention, the method including the steps of transporting the glass plate into a coating chamber, and opening the plurality of coating nozzles which are positioned in a row at constant intervals therebetween along a curved shape of the upper surface of the glass plate in a width direction of the glass plate perpendicular to the direction of transporting the glass plate by the nozzle position adjusting means and the nozzle height adjusting means, to thereby inject the coating solution when the coating nozzles are located in a region of the upper surface of the glass plate which extends from the leading edge of the glass plate to the rear edge of the glass plate.

7 Claims, 9 Drawing Sheets

(56) References Cited

FOREIGN PATENT DOCUMENTS

| | | | |
|---|---|---|---|
| JP | 54-63142 A | | 5/1979 |
| JP | 058450/1982 | | 4/1982 |
| JP | 60262652 A | * | 12/1985 |
| JP | 2-74540 A | | 3/1990 |
| JP | 5-67358 U | | 9/1993 |
| JP | 567358 U | * | 9/1993 |
| JP | 7-328506 A | | 12/1995 |
| JP | 08-017723 A | | 1/1996 |
| JP | 08017723 A | * | 1/1996 |
| JP | 9-92134 A | | 4/1997 |
| JP | 9-164364 A | | 6/1997 |
| JP | 10-99747 A | | 4/1998 |
| JP | 11-151458 A | | 6/1999 |
| JP | 11-217240 A | | 8/1999 |
| JP | 2000-5677 A | | 1/2000 |
| JP | 2000-229258 A | | 8/2000 |
| JP | 2000229258 | * | 8/2000 |
| JP | 2001-70869 A | | 3/2001 |
| JP | 2001-259499 A | | 9/2001 |
| JP | 2001259499 A | * | 9/2001 |
| JP | 2002-164272 A | | 6/2002 |
| JP | 2003-53243 A | | 2/2003 |
| JP | 2003-170086 A | | 6/2003 |
| JP | 2006-175421 A | | 7/2006 |
| JP | 2006-247589 A | | 9/2006 |
| JP | 2007-105643 A | | 4/2007 |
| JP | 2007-175663 A | | 7/2007 |

OTHER PUBLICATIONS

Japanese-language office Action dated Jan. 15, 2013 (Two pages).*
Japanese-language Office Action dated Dec. 28, 2012 (Three pages).*
English Translation JP5-67358 U Sep. 7, 1993.*
State Intellectual Property Office Action (SIPO) dated Jun. 19, 2012 with Japanese translation (Nine (9) pages).
International Search Report Dated Mar. 24, 2009 including English translation (Nine (9) pages).
PCT/ISA/237 dated Mar. 24, 2009 (Five (5) pages).
Japanese-language Office Action dated Jan. 15, 2013 (Two (2) pages).
Japanese-language Office Action dated Dec. 28, 2012 (Three (3) pages).

* cited by examiner

APPARATUS AND METHOD OF APPLYING A COATING SOLUTION

TECHNICAL FIELD

The present invention relates to an apparatus and a method of applying a coating solution onto a surface of a plate-like article such as a glass plate and a resin panel. More particularly, the present invention relates to an apparatus and a method of applying a quick drying coating solution, for instance, a film forming liquid which is used for forming an infrared ray (IR) cutting film by applying a silica binder containing indium tin oxide (ITO), etc., onto a curved profile surface of a glass plate such as a window glass of automobiles.

In addition, the present invention relates to an apparatus for uniformly applying a minimum amount of a coating solution onto a surface of a plate-like article such as a glass plate and a resin panel without causing wraparound of the coating solution to a rear surface of the article. More particularly, the present invention relates to an apparatus for applying a coating solution which is useful to uniformly form a film to be used for the purpose of defogging and defrosting a case such as a refrigeration showcase.

BACKGROUND ART

Conventionally, there have been proposed various methods and apparatuses useable in a case where a coating solution is applied to a plate-like article such as a glass plate and a resin panel. The conventional methods include a method of applying a coating solution with a brush, a method of spraying a coating solution through a nozzle, a curtain flow coating method of showering a coating solution through a slit-shaped nozzle, a spin coating method of applying and spreading a coating solution over a plate-like article by rotating the article, and a method of transferring a coating solution applied onto a rotational rubber roll to a plate-like article.

For example, Japanese Patent Application Unexamined Publication No. 7-328506 (Patent Literature 1) discloses a brush-type coating apparatus for applying a coating material to an end periphery of an upper surface of a plate-like article with a brush that is held on a robot arm. The brush-type coating apparatus includes a leftward and rightward slide device mounted to the robot arm. The leftward and rightward slide device has a slider that is guided on a guide bar so as to be slidable in leftward and rightward directions and biased along the guide bar by a spring. An upward and downward slide device is mounted to the slider. The upward and downward slide device includes a guide cylinder that guides a slide bar so as to be slidable in a direction perpendicular to the guide bar, and a spring that biases the slide bar upwardly. A lower face roller is mounted to a lower end portion of the slide bar and brought into press contact with an end edge of a lower face of the plate-like article by a biasing force of the spring. A coating material feeding device is mounted to an upper end portion of the slide bar. The coating material feeding device feeds the coating material to the brush contacted with an end periphery of an upper face of the plate-like article under a condition that the lower face roller is in contact with the end periphery of the lower face of the plate-like article. An end face roller is mounted to a positioning portion of the upward and downward slide device and brought into press contact with an end face between the end peripheries of the upper and lower faces of the plate-like article by the biasing force of the spring of the guide bar.

Japanese Patent Application Unexamined Publication No. 11-151458 (Patent Literature 2) discloses a method of applying a liquid chemical to a surface of a plate-like article stopped in a predetermined position on a conveyer. An elongated brush having a width larger than a length of one side of the plate-like article is immersed in the liquid chemical and moved upward and downward along a shape of a curving surface of the plate-like article between one end side and the opposite side of the plate-like article so as to be reciprocated by at least one stroke and thereby uniformly apply the liquid chemical to the surface of the plate-like article. The brush is downwardly moved and passed between a pair of squeezing rolls which are actuated by an open/close cylinder and then moved into an open position. A tip end portion of the brush is immersed in a liquid chemical-filled tank, and then the liquid chemical adheres to the brush is reduced to a desired amount by allowing the brush to upwardly move between the squeezing rolls held in a closed position. After that, the amount of the liquid chemical is applied to the surface of the plate-like article with the brush.

Japanese Patent Application Unexamined Publication No. 11-217240 (Patent Literature 3) discloses a method for acid treatment of a glass plate, specifically, a method of spraying an acid solution on a surface of a plate-like article that is horizontally and continuously transported on a conveyer. A shower liquid tank is disposed above the conveyer transporting the glass plate. A plurality of fine holes are uniformly arranged at equal intervals in a bottom of the liquid tank. A liquid level of the acid solution within the liquid tank which is fed by a feeder is kept constant. The acid solution is allowed to drop by gravity on an upper surface of the glass plate through the fine holes formed in the bottom of the liquid tank, so that the acid solution is uniformly sprayed on the surface of the glass plate.

For example, Japanese Patent Application Unexamined Publication No. 2007-175663 (Patent Literature 4) discloses a spray-coating method using nozzles, i.e., a method of forming a coat on a film-forming surface of a substrate. The method includes the steps of holding the substrate so as to form a predetermined angle between the film-forming surface and a vertical plane, injecting a coating solution through a plurality of nozzles onto the film-forming surface, and moving at least one of the substrate and the nozzles such that the nozzles and the film-forming surface are moved relative to each other while injecting the coating solution.

As to the method of showering the coating solution with slit-type nozzles, Japanese Patent Application Unexamined Publication No. 2006-175421 (Patent Literature 5) discloses a coating apparatus for applying a coating solution to a substrate which includes a substrate holding stage disposed at a center between a pair of parallel rails, first and second gate displacement mechanisms that are disposed so as to span the rails symmetrically with respect to a center line of the substrate holding stage in a width direction thereof extending perpendicular to the rails in plan view of the substrate holding stage and be independently moveable on the rails.

Japanese Patent Application Unexamined Publication No. 09-164364 (Patent Literature 6) discloses a spin coating method of applying a coating solution over a plate-like article and spreading the coating solution by rotating the plate-like article. In the spin coating method, a coating solution for forming a coat is dropped on a center of a surface of a workpiece W and uniformly spread over the surface of the workpiece W. At this time, a part of the coating solution runs around an outer periphery of the workpiece W and reaches an underside of the workpiece W. However, the workpiece W coated with the coating solution is fed as such to a reduced pressure drying device 3 and dried to some extent. Next, the workpiece is transported to a chuck 42 of a washing spinner 4 by a transportation device 6 and rotated at a high speed while being kept sucked by the chuck 42, and at the same time, a washing liquid is injected from a nozzle 43 to the underside of the workpiece to thereby wash away the wraparound part of the coating solution which is solidified on the underside of the workpiece to some extent.

Japanese Patent Application Unexamined Publication No. 09-092134 (Patent Literature 7) discloses a nozzle coating method of applying a coating solution injected through a nozzle to a plate such as a substrate. In the nozzle coating method, the coating solution is injected from a tip end of a nozzle which is spaced from a planar surface of a workpiece to which the coating solution is to be applied. At the same time, the nozzle is moved relative to the surface to be applied in parallel relation thereto so that the coating solution is applied onto the surface in the form of a coating line. The formation of the coating line is successively and repeatedly performed in such a manner that a part of the next coating line overlaps with the previous coating line in a width direction thereof. The coating solution is thus applied onto the substrate to form a coated surface.

Patent Literature 1: Japanese Patent Application Unexamined Publication No. 7-328506
Patent Literature 2: Japanese Patent Application Unexamined Publication No. 11-151458
Patent Literature 3: Japanese Patent Application Unexamined Publication No. 11-217240
Patent Literature 4: Japanese Patent Application Unexamined Publication No. 2007-175663
Patent Literature 5: Japanese Patent Application Unexamined Publication No. 2006-175421
Patent Literature 6: Japanese Patent Application Unexamined Publication No. 09-164364
Patent Literature 7: Japanese Patent Application Unexamined Publication No. 09-092134

SUMMARY OF INVENTION

In the conventional art described in the Patent Literature 1, the coating material such as a washing agent, a primer and an adhesive is applied to a surface of the glass plate with a brush. Therefore, in a case where the coating material is applied to an entire surface of the glass plate with the brush, there will occur a step or unevenness at a boundary between an already coated portion of the glass plate surface and a non-coated portion thereof before subjecting to application of the coating material. Further, since a long application time is needed in order to apply the coating material to the entire surface of the glass plate with the brush, the coating solution in the brush is solidified which inevitably results in occurrence of unevenness in coating.

In the conventional art described in the Patent Literature 2, the elongated brush having a width larger than a length of one side of the curved window glass of an automobile is immersed in the liquid chemical and moved upward and downward along a shape of a curving surface of the plate-like article between one end and the opposite end of the plate-like article so as to be reciprocated by at least one stroke and thereby uniformly apply the liquid chemical to the surface of the plate-like article. Therefore, the conventional art described in the Patent Literature 2 is improved so as to reduce the above-described problems in the conventional art described in the Patent Literature 1. However, in a case where a quick drying liquid chemical is applied to a glass plate having such a size as that of a window glass of an automobile, much application time is needed to apply the liquid chemical to an entire surface of the glass plate, and therefore, the liquid chemical on an already coated portion of the surface of the glass plate is solidified and crystallized before finishing coating of the entire surface of the glass plate. There occurs a step or unevenness at a boundary between the already coated portion of the surface of the glass plate and a non-coated portion thereof before subjecting to coating.

Further, in the conventional method of showering the coating solution as described in the Patent Literature 3, there occurs a loss of the coating solution due to increase in splashing off the coating solution outside of the surface of the glass plate, and it tends to cause wraparound of the coating solution to the underside of the glass plate. In particular, in a case where the coating solution to be showered is a quick drying coating solution, the coating solution is partially crystallized to cause unevenness in coating thickness as the coating solution is dried.

Further, in the conventional method of spraying the coating solution through nozzles as described in the Patent Literature 4, an upper peripheral side of the film-forming surface of the glass plate is supported in a suspended state, and a plurality of nozzles are moved from one vertical side of the glass plate toward the opposite vertical side thereof while spraying the coating solution from the nozzles. Since the coating solution is applied to the surface of the glass plate is flowed downwardly along the surface of the glass plate, the surface coated with the coating solution by the lower-side nozzle is further coated with the coating solution by the upper-side nozzle so that production of a coat having a uniform thickness is prevented due to the overlapped application of the coating solution.

In the conventional method as described in the Patent Literature 5, the coating solution is showered from a slit nozzle that has an elongated slit portion on an upper side of the glass substrate that is transported in a horizontal attitude. Therefore, the coating solution tends to wrap around the edge portion of the glass substrate and reach the underside of the glass substrate. In a case where the coating solution has a water absorptivity to absorb a moisture in the air which causes a problem in quality, the moisture in the air is absorbed in the coating solution which is then collected and circulated after being dropped from the surface of the glass plate, thereby causing deterioration in properties of the coating solution or adhesion of lint suspended in the air thereto.

Further, in the conventional spin-coating method of applying a coating solution to a plate-like article and spreading the coating solution by rotating the plate-like article as described in the Patent Literature 6, an amount of the coating solution which is not less than its amount to be applied to the glass substrate is supplied and a surplus of the coating solution is dropped by centrifugal force. Therefore, in a case where the coating solution dropped which has a water absorptivity causing a problem in quality is collected and circulated, the moisture in the air is absorbed in the coating solution during circulating the coating solution upon use, thereby causing deterioration in properties of the coating solution. Further, in a case where the glass substrate has a rectangular shape, the coating solution tends to wrap around the edge portion of the glass substrate and reach the underside of the glass substrate.

Further, in the conventional method as described in the Patent Literature 7, the nozzle is driven in a direction X (i.e., a direction perpendicular to a direction of transporting the glass plate) so as to form a coating line of the coating solution, and then the nozzle is moved in a direction Y (i.e., the direction of transporting the glass plate) by a pitch P that is smaller than a width of the coating line so as to form a next coating line of the coating solution. Thus, the coated surface of the glass plate is formed by successively applying the coating solution to the entire surface of the glass plate in such a forcible manner that the coating lines adjacent to each other in a width direction thereof partially overlap with each other. Therefore, as an surface area of the glass plate becomes larger, a time required for coating the entire surface area of the glass plate will be increased and control of the nozzle will be complicated.

A first object of the present invention is to solve the above problems in the conventional arts and provide a simply constructed apparatus and a method of uniformly applying a necessary minimum amount of a quick drying coating solution to only an upper surface of a curved glass plate having a concaved central portion of the upper surface at high speed without causing unevenness.

A second object of the present invention is to solve the above problems in the conventional arts and provide a simply constructed apparatus and a method of applying a necessary minimum amount of a coating solution that tends to absorb a moisture in the air to an upper surface of a rectangular flat plate-like article such as a glass plate and a resin panel with a coating efficiency of 100% without circulating the coating solution, to thereby form a uniform coat on the upper surface of the plate-like article without causing wraparound of the coating solution to an underside of the plate-like article.

In a first aspect of the present invention, there is provided an apparatus for applying a coating solution onto an upper surface of an irregular-shaped glass plate that is transported in a substantially horizontal attitude on a conveyer, in a preliminary coat forming step, the apparatus comprising:

a detecting means for detecting a leading edge of the glass plate in a direction of transporting the glass plate by a transporting means;

a plurality of coating nozzles which are arranged in a row at constant intervals therebetween in a width direction of the glass plate perpendicular to the direction of transporting the glass plate and inject the coating solution therefrom;

a nozzle height adjusting means for variably adjusting heights of the respective coating nozzles;

a nozzle position adjusting means for variably adjusting horizontal positions of the respective coating nozzles; and a controller configured to open the coating nozzles and supply the coating solution from the coating nozzles to a region of the upper surface of the glass plate which extends from the leading edge of the glass plate to a rear edge of the glass plate.

Further, in the first aspect of the present invention, there is provided a method of applying a coating solution to an upper surface of a glass plate to be transported in a substantially horizontal attitude in a preliminary coat forming step, by using the above-described apparatus, the method comprising the steps of: transporting the glass plate into a coating chamber; and opening the plurality of coating nozzles which are positioned in a row at constant intervals therebetween along a curved shape of the upper surface of the glass plate in a width direction of the glass plate perpendicular to the direction of transporting the glass plate by the nozzle position adjusting means and the nozzle height adjusting means, to thereby inject the coating solution when the coating nozzles are located in the region which extends from the leading edge of the glass plate to the rear edge of the glass plate.

In a second aspect of the present invention, there is provided an apparatus for applying a coating solution onto an upper surface of a rectangular glass plate that is transported on a transporting roll at a horizontal attitude at a constant speed, the apparatus comprising:

a plurality of nozzles for supplying the coating solution which are disposed with a predetermined pitch in a width direction of the glass plate perpendicular to a direction of transporting the glass plate;

a coating solution tank connected to each of the nozzles through a tube;

an electromagnetic valve disposed between each of the nozzles and the tube, the electromagnetic valve being operative to start and stop supply of the coating solution, each of the nozzles having a needle portion on a tip end portion thereof from which the coating solution is injected, the needle portions being arranged in a vertical direction perpendicular to the upper surface of the glass plate; and a leveling means for leveling strip-shaped coating portions provided on the upper surface of the glass plate while transporting the glass plate after the strip-shaped coating portions are provided in parallel to each other at intervals substantially ranging from a/4 to a/30 assuming that a width of each of the strip-shaped coating portions immediately after application of the coating solution onto the upper surface of the glass plate between the leading edge of the glass plate and the rear edge thereof by injecting the coating solution from the needle portions is represented by "a", to thereby spread areas of the strip-shaped coating portions until a clearance between the strip-shaped coating portions adjacent to each other is eliminated and form a coat having a uniform thickness on the upper surface of the glass plate.

The application apparatus may include a fine vibration applying means for forcibly applying fine vibration to the glass plate on the transporting roll. The fine vibration applying means serves as the leveling means. The fine vibration applying means may be a mechanical vibration means or an ultrasonic wave vibration means which is so constructed as to facilitate spreading the areas of the strip-shaped coating portions.

The first and second objects of the present invention can be achieved in the first and second aspects of the present invention, respectively.

DETAILED DESCRIPTION OF INVENTION

Figure 1:
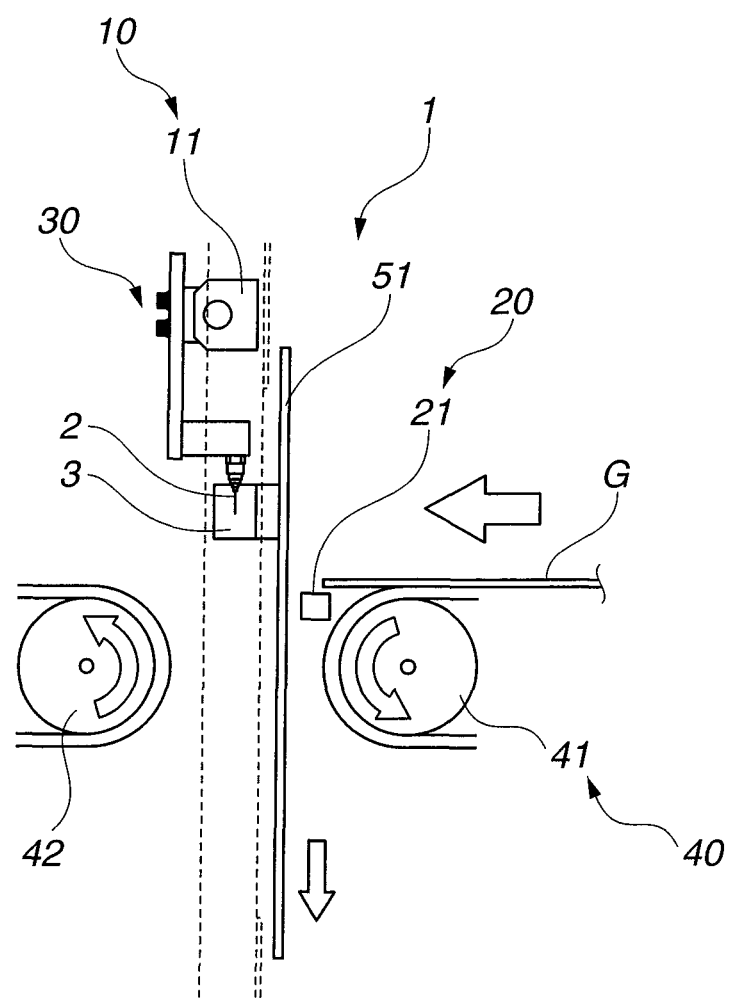
FIG. 1 is a side view of an application apparatus in the first aspect of the present invention.

Effects of the first aspect of the present invention are explained hereinafter.

In a case where a quick-drying coating solution is applied to an upper surface of a plate-like article such as a flat or curved irregular-shaped glass plate, it is possible to uniformly apply the coating solution to the upper surface of the plate-like article without causing unevenness in coating thickness, and minimize a loss in amount of the coating solution, with a simple construction.

Further, an upper opening of a solvent tank is closed by coating nozzles which are inserted into the upper opening and serve as lids such that tip ends of the coating nozzles are immersed into a solvent within the solvent tank. With this construction, it is possible to prevent the coating solution in the coating nozzles from clogging the coating nozzles due to drying and solidification thereof and suppress evaporation to dryness of the solvent within the solvent tank.

Further, since the coating solution is sprayed on the surface of the glass plate so as to form parallel lines at equivalent intervals therebetween, it is possible to readily, quickly and uniformly spread the coating solution on the surface of the glass plate without causing unevenness in coating thickness by using a sheet material attached to a hand of an articulated robot in a succeeding step before the coating solution on the surface of the glass plate is dried. This spraying method can minimize an amount of the coating solution to be applied, resulting in remarkable cost reduction.

Further, in a case where an elongated attachment member having a width not less than a length of a side of the glass plate is attached to the sheet material, it is possible to apply the coating solution onto the surface of the glass plate in a seamless manner at a high speed and thereby increase the working efficiency and the production efficiency.

Further, in a case where the sheet material is made of a nonwoven fabric, it is possible to prevent lint and dust from adhering to the surface coated with the coating solution.

Effects of the second aspect of the present invention are explained hereinafter.

A plurality of linear coating strips are provided in parallel to each other at equivalent intervals therebetween by applying a coating solution to an upper surface of a plate-like article such as a rectangular and flat glass plate or resin panel with such a construction in which a plurality of nozzles are disposed spaced from each other with a constant pitch in a width direction of the plate-like article, and are spread and flattened by leveling until a clearance between the adjacent coating strips in a width direction thereof is eliminated. As a result, it is possible to uniformly apply the coating solution to an entire upper surface of the glass plate without unevenness in coating thickness.

Further, since the linear coating strips are provided on the upper surface of the glass plate in parallel to each other at equivalent intervals therebetween by using the plurality of nozzles disposed spaced from each other with the constant pitch, a large amount of the coating solution is not necessary as compared to a dip coating method or a curtain flow coating method and a loss in amount of the coating solution can be suppressed to thereby achieve remarkably high coating efficiency of almost 100%.

Furthermore, in the second aspect of the present invention, a portion extending from the coating solution tank to needle portions of the nozzles is constructed so as to have a hermetically sealed structure to thereby protect the coating solution from contacting with moisture in the outside air, and about 100% of the amount of the coating solution applied can adhere to the upper surface of the plate-like article. Therefore, it is not necessary to collect and recycle the coating solution as conducted by the curtain flow coating method and the spin coating method. In addition, there occurs no change in quality of the coating solution due to absorption of moisture in the air which is caused in such a case that the coating solution is collected and recycled. Thus, owing to the hermetically sealed structure of the portion extending from the coating solution tank to the nozzles, it is possible to always keep a good quality of the coating solution.

A preferred embodiment according to the first aspect of the present invention is explained in detail hereinafter.

As shown in FIG. 1, an application apparatus according to the first aspect of the present invention includes a transporter 40 for transporting a glass plate G while keeping it in a horizontal attitude, a detector 20 for detecting a leading edge of the glass plate G to be transported by the transporter 40 in a direction of transporting the glass plate G, and a plurality of coating nozzles 2, 2, . . . for supplying a coating solution which are disposed in a row at constant intervals therebetween in a direction perpendicular to the direction of transporting the glass plate G. The apparatus further includes a nozzle height adjuster 30 for variably adjusting heights of the respective coating nozzles 2, 2, . . . , a nozzle position adjuster 10 for variably and movably adjusting positions of the respective coating nozzles 2, 2, . . . in a width direction of the glass plate (i.e., a horizontal direction), and a controller (not shown) that controls start and stop of supplying the coating solution from the coating nozzles 2, 2, . . . to a region of the upper surface of the glass plate which extends from a leading edge of the glass plate G to a rear edge (i.e., a terminal edge) of the glass plate G in the direction of transporting the glass plate.

The application apparatus 1 is disposed in the vicinity of an inlet of a coating chamber 50 through which the glass plate G transported enters into the coating chamber. In order to allow the glass plate G to enter into the coating chamber 50, either the coating nozzles 2, 2, . . . or a solvent tank 3 is fixed to an inside of an ascent/descent door 51 that is moveable to an opened state and a closed state. The inside of the ascent/descent door 51 is exposed to an interior of the coating chamber 50. When the ascent/descent door 51 is in the opened state, the tip end portions of the coating nozzles 2, 2, . . . and the solvent tank 3 are separated from each other in an up-and-down direction. When the ascent/descent door 51 is in the closed state, the tip end portions of the coating nozzles 2, 2, . . . are always immersed in a solvent within the solvent tank 3 so that the coating solution present in the tip end portions of the coating nozzles 2, 2, . . . can be prevented from being cured and crystallized due to drying, whereby occurrence of clogging in the coating nozzles 2, 2, . . . can be suppressed.

The nozzle position adjuster 10 includes a nozzle mounting lateral rail 11 that is disposed in a horizontal direction perpendicular to the direction of transporting the glass plate G. The coating nozzles 2, 2, . . . are mounted on the nozzle mounting lateral rail 11 in a row and moveable thereon, respectively, so that the mounting positions of the respective coating nozzles 2, 2, . . . are adjustable along the nozzle mounting lateral rail 11.

The nozzle height adjuster 30 includes vertical rails (not shown) provided on a mounting bracket which is fixed on the nozzle mounting lateral rail 11. The vertical rails are disposed in the mounting positions of the respective coating nozzles 2, 2, . . . and extend in a vertical direction. The coating nozzles 2, 2, . . . are disposed on the vertical rails so as to be moveable upwardly and downwardly, respectively, so that heights of the respective coating nozzles 2, 2, . . . are adjustable along a curved surface of the glass plate G.

Figure 2:
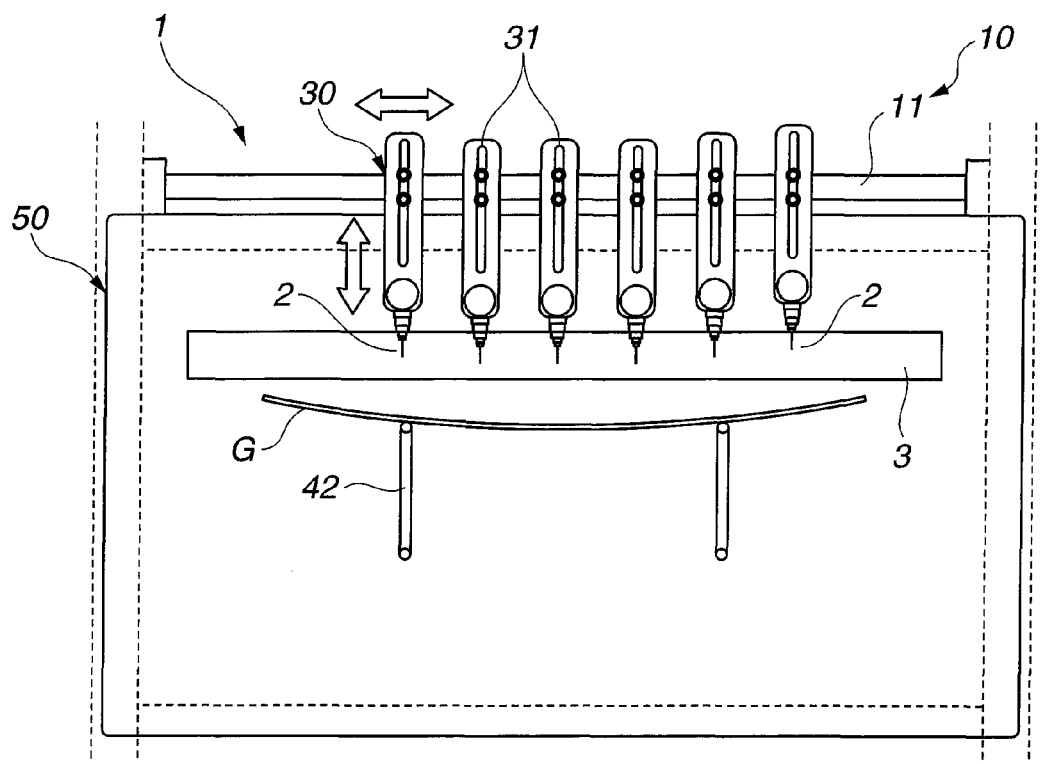
FIG. 2 is a front view of the application apparatus in the first aspect of the present invention.

Specifically explaining adjustment of the height of each of the coating nozzles 2, a plurality of height-adjusting perforated portions (not shown) may be formed in each of the vertical rail with a constant pitch in a row. The coating nozzles 2 are mounted to the perforated portions different in height from each other, respectively. Alternatively, instead of the plurality of height-adjusting perforated portions, elongated holes 31 each having a length of about 100 mm may be formed as shown in FIG. 2. The coating nozzles 2 are mounted to the respective elongated holes 31 so as to be moveable within a region from an upper end of each elongated hole 31 to a lower end thereof. Thus, the mounting heights of the coating nozzles may be adjustable.

The reason for adjusting the heights of the coating nozzles 2 along the shape of the curved surface of the glass plate G is as follows. If the heights of the respective coating nozzles 2 from the surface of the glass plate G are different from each other, drops of the coating solution occasionally will be deflected and prevented from falling just downward on the surface of the glass plate G due to a flow of the atmosphere around the coating nozzles which is caused by the glass plate G that is transported from an outside of the coating chamber into the coating chamber. Further, there will occur increase in area of the surface of the glass plate G in which the coating solution is spattered upon dropping on the surface of the glass plate G, thereby wrapping the coating solution around the periphery of the glass plate G to reach an underside surface of the glass plate G or causing a loss in amount of the coating solution.

The transporter 40 includes a supply conveyer 41 and a discharge conveyer 42 which are disposed on the ascent/descent door 51 as an inlet for introducing the glass plate G into the coating chamber 50. The supply conveyer 41 is disposed on a side of the ascent/descent door 51 which faces to an outside of the coating chamber 50. The discharge conveyer 42 is disposed on a side of the ascent/descent door 51 which faces to an inside of the coating chamber 50. The discharge conveyer 42 is disposed on a downstream side of the supply conveyer 41 in an opposed relation to the supply conveyer 41 such that the ascent/descent door 51 is interposed between the supply conveyer 41 and the discharge conveyer 42. When the ascent/descent door 51 is moved to the opened state, the supply conveyer 41 and the discharge conveyer 42 are connected to each other. When the ascent/descent door 51 is moved to the closed state, the two conveyers 41 and 42 are separated from each other by the ascent/descent door 51.

The coating chamber 50 is a box-shaped and substantially hermetically sealed chamber in which air conditioning regarding temperature, moisture, dust and the like, is kept under a constant control condition. The opening and closing operation of the ascent/descent door 51 is carried out only when the glass plate G is supplied into the coating chamber 50. Similarly, the opening and closing operation of another ascent/descent door (not shown) serving for discharging the glass plate G is carried out when the glass plate G is discharged from the coating chamber 50.

The detector 20 is disposed in the vicinity of the most downstream position of the supply conveyer and detects a leading edge of the glass plate G that is supplied into the coating chamber by the supply conveyer. In response to the detection of the leading edge of the glass plate G by the detector 20, the ascent/descent door 51 of the coating chamber can be opened to thereby transport the glass plate G to the inside of the coating chamber.

Preferably, a sensor, for instance, a laser, which detects the leading edge of the glass plate G is disposed in a horizontal direction at one position parallel to the surface of the glass plate G to be transported and parallel to the ascent/descent door such that the sensor is turned on when being interrupted by the most downstream side leading edge of the glass plate G. Further, a proximity sensor may be disposed in a vertical direction at a position through which the leading edge of the glass plate G passes.

The ascent/descent door 51 is normally kept in the closed state. In the closed state of the ascent/descent door 51, the tip end of the coating nozzle 2 is directed downwardly and immersed in the solvent within the solvent tank 3. The solvent tank is fixed to the side of the ascent/descent door 51 which faces to the inside of the coating chamber. The nozzle position adjuster 10 that supports the coating nozzles 2 is fixedly disposed in the coating chamber separately from the ascent/descent door 51. In this case, as the ascent/descent door is downwardly moved, the solvent tank descends together with the door so that the coating nozzles and the solvent tank are separated from each other.

In the case where the solvent tank is fixed to the side of the ascent/descent door 51 which faces to the inside of the coating chamber, when the ascent/descent door 51 is in the opened state, it is necessary that lower ends of the coating nozzles 2 which are located at fixed heights are positioned above the upper surface of the glass late G and the solvent tank is positioned below the upper-most surface of the discharge conveyer.

A plurality of solvent tanks 3 may be disposed to each independently receive the plurality of coating nozzles 2, 2 . . . therein. However, it is preferred to provide a single solvent tank such that all the coating nozzles 2, 2 . . . are immersed in the solvent within the single solvent tank. The reason for providing the single solvent tank is as follows. When the solvent is replenished into the solvent tank, the solvent can be uniformly distributed throughout the inside of the solvent tank.

On the other hand, the nozzle position adjuster 10 that supports the coating nozzles 2 may be fixed to the side of the ascent/descent door 51 which faces to the inside of the coating chamber. The solvent tank may be disposed separately from the ascent/descent door and in a position lower than the surface of the discharge conveyer in the coating chamber. In such a case, as the ascent/descent door is upwardly moved, the coating nozzles ascend so that the coating nozzles 2 and the solvent tank are separated from each other.

In the case where the nozzle position adjuster 10 is fixed to the side of the ascent/descent door 51 which faces to the inside of the coating chamber, when the ascent/descent door is in the opened state, it is necessary to position the lower ends of the coating nozzles 2 above the upper surface of the glass plate G and position the solvent tank located at fixed height below the upper-most surface of the discharge conveyer.

The controller (not shown) is configured to execute ON/OFF control of supply of the coating solution from the coating nozzles 2, 2 . . . to a region of the upper surface of the glass plate G which extends from the leading edge to the rear edge thereof, and generate a command to move the ascent/descent door in the up-and-down direction.

When the glass plate G is transported to the vicinity of the ascent/descent door by the supply conveyer and the leading edge of the glass plate G is detected by the sensor, the ascent/descent door is brought into the opened state. Since either the coating nozzles or the solvent tank are fixed to the side of the ascent/descent door which is exposed to the inside of the coating chamber, the tip ends of the coating nozzles and the solvent tank are relatively moved to separate from each other in the up-and-down direction when the ascent/descent door is brought into the opened state. At this time, the apparatus is kept in a standby state in which the respective coating nozzles are ready for applying the coating solution onto the surface of the glass plate G passing between the coating nozzles and the solvent tank separated from each other. A command for applying the coating solution is outputted by the controller.

Timing of starting supply of the coating solution from the respective coating nozzles is set using a sensor 21 for detecting the leading edge of the glass plate G. The sensor 21 is provided in the vicinity of the most downstream position of the supply conveyer and serves for opening and closing the ascent/descent door. After the leading edge of the glass plate G is detected by the sensor 21, the timing of starting application of the coating solution is set per each coating nozzle by timers T1, . . . Tn such that application of the coating solution is started at the time at which the leading edge of the glass plate G is forwardly passed or transported below the respective coating nozzles by a predetermined distance, that is, application of the coating solution is started from an inside position of the glass plate G which is located rearward apart by the predetermined distance from the leading edge of the glass plate G that is transported.

Figure 5:
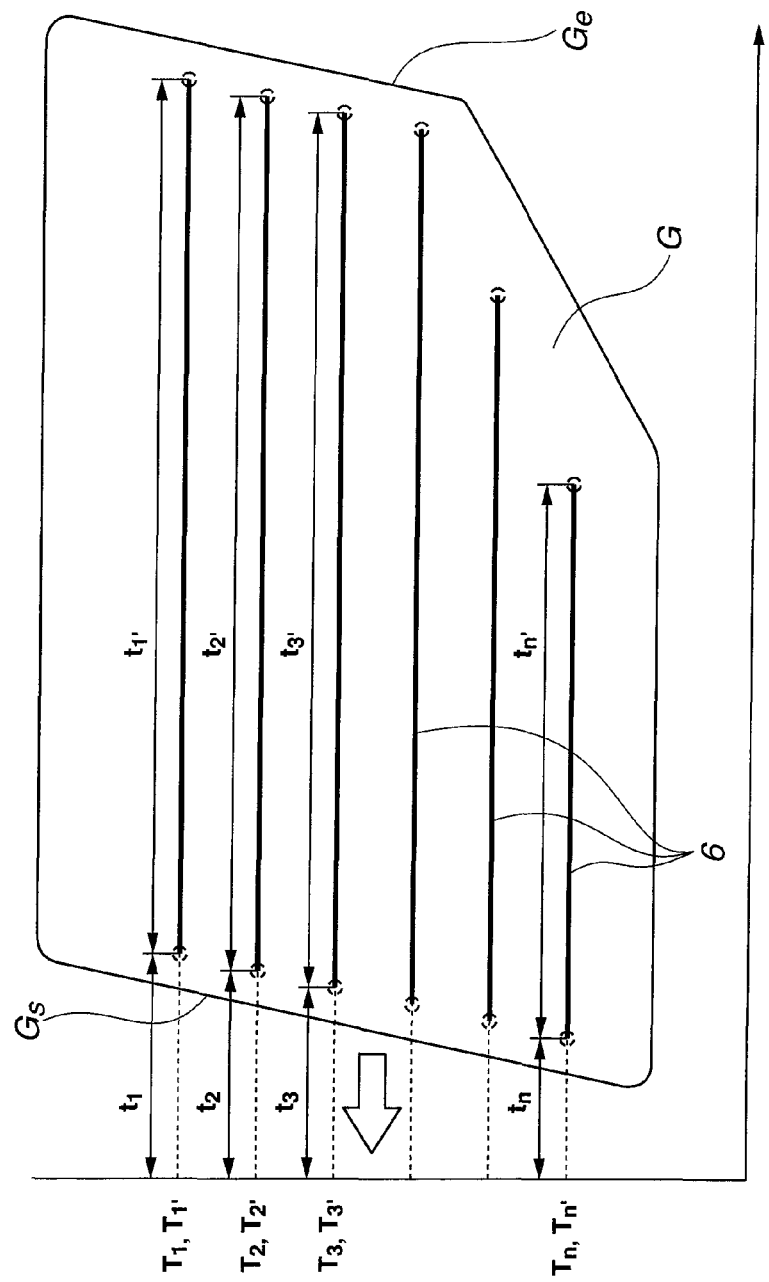
FIG. 5 is a plan view of a glass plate that is used for explaining the application method in the first aspect of the present invention.

More specifically, as shown in FIG. 5, the timers T1-Tn for determining the timing of starting supply of the coating solution are provided for the coating nozzles 2, 2 . . . , respectively, so as to correspond to the shape and position of the leading edge of the glass plate G in the transporting direction which passes below the respective coating nozzles. After the leading edge of the glass plate G is detected by the sensor, supply of the coating solution for the respective coating nozzles is started at the timings of the timers T1-Tn which are set to be different from one another, corresponding to the shape of the leading edge of the irregular shaped glass plate G.

Alternatively, timing of starting supply of the coating solution may be set in another manner as follows. Sensors for detecting the glass plate G are provided in substantially the same positions as mounting positions of the respective coating nozzles which are aligned in a row in the width direction of the glass plate. Supply of the coating solution from each coating nozzle may be started after the leading edge of the glass plate G is detected and at a time at which a predetermined period of time has elapsed from a time at which the leading edge of the glass plate G opposed to the sensors is detected by the sensors.

On the other hand, timing of stopping supply of the coating solution is set as follows. The timers T1'-Tn' respectively provided per each coating nozzle 2, 2 . . . as shown in FIG. 5 are set to be turned off at individual times t1'-tn', respectively, after the glass plate G is detected by the sensor 21 serving for opening and closing the ascent/descent door. The timers T1'-Tn' are set such that the coating solution supplied from the respective coating nozzles 2, 2 . . . is applied up to inside positions on the upper surface of the glass plate G which is located forwardly apart by a predetermined distance from the rear edge of the glass plate G.

Alternatively, timing of stopping supply of the coating solution 6, 6, . . . may be set in another manner as follows. A glass detecting sensor, not shown, serving for generating a command to terminate application of the coating solution is provided in a position on the upper surface of the glass plate G which are offset by about 3 cm from the coating nozzles toward an upstream side thereof in order to stop supply of the coating solution from the coating nozzles in positions on the upper surface of the glass plate G which are spaced forwardly from the rear edge of the glass plate G. In this case, if supply of the coating solution from the coating nozzles is stopped at a time at which the glass detecting sensor serving for generating a command to terminate application of the coating solution is turned off, the supply of the coating solution can be stopped in inside positions on the upper surface of the glass plate G which are located forwardly apart, for instance, by about 3 cm from the rear edge thereof.

Thus, in order to stop supply of the coating solution in the inside positions on the upper surface of the glass plate G which are located forward of the rear edge of the glass plate G, another glass detecting sensor serving for generating a command to terminate application of the coating solution may be provided in the position on the upper surface of the glass plate G which is located offset, for instance, by about 3 cm from the coating nozzles toward an upstream side thereof. In this case, supply of the coating solution from the coating nozzles is stopped at the time at which the glass detecting sensor serving for generating a command to terminate application of the coating solution is turned off.

The above-described controller (not shown) has the timers T1-Tn for controlling the timing of starting supply of the coating solution in the position slightly upstream of the leading edge of the irregular shaped glass plate G after detecting the leading edge of the glass plate G being transported, and the timers T1'-Tn' for controlling the timing of stopping the supply of the coating solution in the position slightly forward of the rear edge of the glass plate G.

Further, the timings of starting and stopping supply of the coating solution from the coating nozzles in respective predetermined positions can be controlled by setting and storing a start time at which supply of the coating solution from the coating nozzles is started and a stop time at which the supply of the coating solution from the coating nozzles is stopped, depending upon kind and shape of the glass plate G, in a host computer of the controller, and by downloading the set start time and the set stop time and a glass plate transporting speed and the like to the controller from the host computer upon changing the kind and the shape of the glass plate G to be transported.

The above-described positions slightly upstream of the leading edge of the glass plate and the above-described positions slightly forward of the rear edge of the glass plate are determined for the following reasons. When the coating solution is dropped from the coating nozzle 2, the coating solution is spread into a generally circular shape over the upper surface of the glass plate G as indicated by broken line in FIG. 4. Therefore, in order to prevent the spread coating solution from running downwardly from the edge of the glass plate G, it is preferred that the coating solution be dropped in the slightly upstream positions and the slightly forward positions. The slightly upstream positions and the slightly forward positions are varied depending on the height of the coating nozzle, the amount of the coating solution, the transporting speed of the glass plate G and the like. The slightly upstream positions and the slightly forward positions may be determined such that the center of the spread coating solution is placed apart by about 2 to 5 cm from the edge of the glass plate G.

The coating nozzles 2 are disposed in positions which are spaced from each other with the constant pitch in the width direction perpendicular to the transporting direction of the glass plate G. The coating solution is supplied from the plurality of the coating nozzles 2, 2 . . . so as to form traces as indicated by thick solid lines in FIG. 4. A plurality of thin string-shaped lines of the coating solution 6, 6 . . . applied to the surface of the glass plate G are spread out in a width direction thereof with the passage of time. In the succeeding step, the spread lines of the coating solution 6, 6 . . . are further spread out with a nonwoven fabric (not shown) by a robot's hand or a person's hand (not shown) so as to have a uniform thickness on only the upper surface side of the glass plate G such that the coating solution is prevented from adhering to the peripheral edge or the underside surface of the glass plate G.

Since the coating solution 6 has a quickly drying and solidifying property, the glass plate G has such a size as that of a window glass for automobiles is firstly subjected to a preliminary coat forming step in which the coating solution 6 is spread uniformly over an entire surface thereof. More specifically, the coating solution 6 is dropped and applied onto the entire surface of the glass plate G by the application apparatus 1 of the present invention. The coating solution 6 applied on the upper surface of the glass plate G is then uniformly spread over the upper surface of the glass plate G with a nonwoven fabric (not shown) before the coating solution 6 is dried and solidified. By thus performing the preliminary coat forming step, it is not necessary to replenish an additional amount of the coating solution 6 during spreading the coating solution 6, so that the coating solution 6 can be readily spread out without unevenness for a shorter period of time.

After completion of the preliminary coat forming step of dropping the coating solution 6, a substantial coat forming step is performed, in which the quick-drying coating solution applied is spread over the upper surface of the glass plate G with the nonwoven fabric so as to form a coat having a uniform thickness thereon.

In the substantial coat forming step (not shown), when the coating solution is uniformly spread over the upper surface of the glass plate G with the nonwoven fabric, the coating solution 6 is impregnated into the nonwoven fabric. If the coating solution thus impregnated in the nonwoven fabric is dried and solidified, unevenness in thickness of the coating solution spread tends to be caused when the coating solution is spread over the upper surface of the glass plate G with the nonwoven fabric at a next coating step. Thus, the repeated use of the nonwoven fabric will be disadvantageous to the glass plates G which are to be subjected to spreading of the coating solution thereon at the second or subsequent coating step. For this reason, it is preferred that the nonwoven fabric once used to which the dried and solidified coating solution has adhered be replaced with a new nonwoven fabric without being recycled, and after that, the coating solution be spread out with the new nonwoven fabric.

Although the invention has been described above by reference to the preferred embodiment according to the first aspect of the invention, the invention is not limited to the first embodiment described above. Modifications and variations of the embodiment described above will be made by those skilled in the art in light of the above teachings.

The glass plate G may be either a flat glass plate or a curved glass plate and may be a glass plate having an irregular shape such as front and rear window glass plates and a side window glass plate for an automobile. Further, examples of the glass plate G include a single plate such as a tempered glass plate, a semi-tempered glass plate and a green glass plate, or a laminated glass plate formed by bonding a plurality of tempered glass plates to each other or bonding the tempered glass plate to the green glass plate through an intermediate layer or a resin injection layer made of PVB resin, EVA resin or the like.

Furthermore, the invention may be applied to various kinds of panels such as a resin plate, a wood plate and the like without limiting to the glass plate G.

A preferred embodiment according to the second aspect of the invention will be illustratively explained in detail hereinafter.

Figure 6:
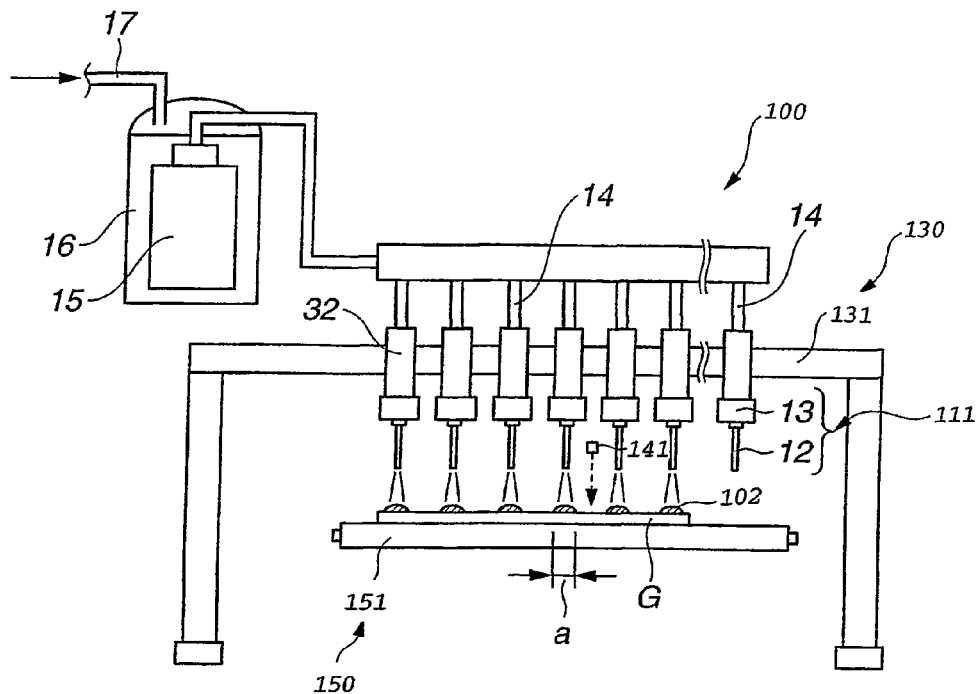
FIG. 6 is a front view of the application apparatus in the second aspect of the present invention.

As shown in FIG. 6, the application apparatus 100 includes a plurality of nozzles 111 for supplying a coating solution which are disposed with a constant pitch in a width direction of the glass plate G perpendicular to the direction of transporting the glass plate G. The respective nozzles 111, 111 . . . are connected to a coating solution tank 15 through tubes 14. Electromagnetic valves 13 are disposed between the respective tubes 14 and the respective nozzles 111, 111 and are operated to allow and stop the supply of the coating solution from the nozzles.

Needle portions 12 are arranged on tip end portions of the respective nozzles 111, 111 . . . in a vertical direction perpendicular to the surface of the glass plate G disposed in a horizontal attitude. The needle portions 12 are operative to inject the coating solution therefrom. The coating solution is applied onto the upper surface of the glass plate G such that strip-shaped coating portions 102, 102 . . . are provided in parallel to each other at intervals substantially ranging from a/4 to a/30 assuming that a width of each of the strip-shaped coating portions 102, 102 . . . formed on the upper surface of the glass plate G between a leading edge of the glass plate and a rear edge (i.e., a terminal edge) thereof by injecting the coating solution from the needle portions 12 is represented by "a". At this time, the glass plate G is horizontally arranged with a high accuracy and the needle portions 12 are disposed in the direction perpendicular to the surface of the glass plate G.

Figure 7:
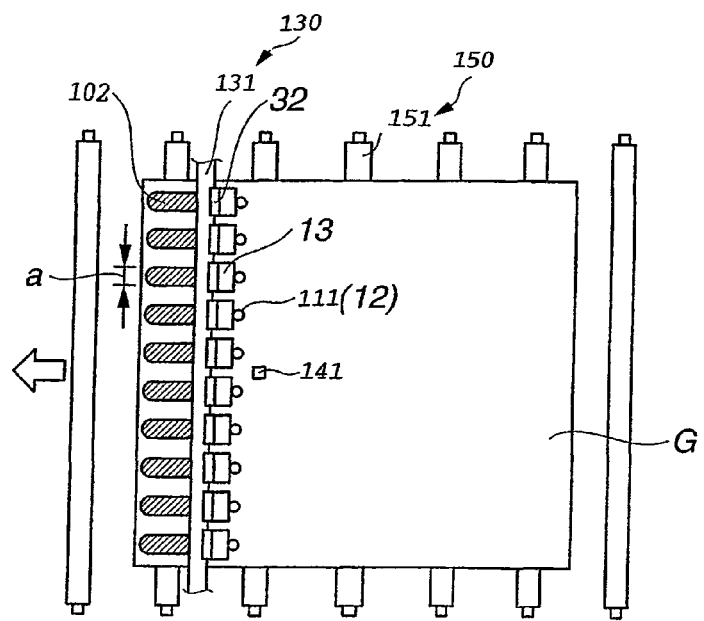
FIG. 7 is a plan view of the application apparatus in the second aspect of the present invention.

As shown in FIG. 7, when the plurality of strip-shaped coating portions 2 are formed on the upper surface of the glass plate G in parallel to one another by the application apparatus 100, the strip-shaped coating portions 102, 102 . . . on the upper surface of the glass plate G are leveled by a leveling device while transporting the glass plate G, so that areas of the strip-shaped coating portions 102, 102 . . . are spread until a clearance between the strip-shaped coating portions 102, 102 . . . adjacent to each other is eliminated to thereby form a coat having a uniform thickness on the upper surface of the glass plate G.

A portion extending from a coating solution tank 15 accommodated within a pressurized tank 16 to the needle portions 12 of the nozzles 111 has a substantially hermetically sealed structure to shield the portion from moisture of the outside air, and the coating solution injected from the needle portions 12 is prevented from being recirculated and reused. Further, a dried and clean air is used as the air to be fed into the pressurized tank 16 via pipe 17 connected to the pressurized tank 16.

It is preferred that the respective nozzles 111 be made of a stainless steel (SUS304), the respective needle portions 12 have an inner hole diameter of 0.5 mm to 3.0 mm and a length of 5 mm to 30 mm, a distance from a lower end of the respective needle portions 12 to the upper surface of the glass plate G be in the range of 5 mm to 150 mm, and an interval between the adjacent needle portions 12, 12 . . . be in the range of 5 mm to 100 mm.

The reason why the inner hole diameter of the needle portions 12 is preferably in the range of 0.5 mm to 3.0 mm is that the amount of the coating solution to be applied onto the upper surface of the glass plate G and the width of the strip-shaped coating portions on the upper surface of the glass plate G can be readily controlled. If the inner hole diameter of the needle portions 12 is too small, there tends to occur clogging in the needle portions or spattering of the coating solution due to rise of coating pressure. If the inner hole diameter of the needle portions 12 is too large, it may become difficult to control the amount of the coating solution injected from the needle portions, or the coating solution remaining in the needle portions might be dropped onto positions not intended due to sagging of the remaining coating solution depending upon a viscosity of the coating solution even when supply of the coating solution is stopped.

Further, the reason why the length of the needle portions 12 is preferably in the range of 5 mm to 30 mm is as follows. If the length of the needle portions 12 is smaller than 5 mm, it may become difficult to set the needle portions in the vertical direction. Therefore, it is advantageous to slightly increase the length of the needle portions. However, if the length of the needle portions 12 is larger than 30 mm, there tends to occur bending of the needle portions or it may be necessary to enlarge peripheral equipments around the needle portions, which leads to difficulties in handling the apparatus.

The reason why the distance from the lower end of the respective needle portions 12 to the upper surface of the glass plate G is preferably in the range of 5 mm to 150 mm is as follows. If the distance is less than 5 mm, there tends to occur such a risk that the needle portions are brought into contact with the glass plate G and thereby the height of the needle portions must be adjusted upon changing the thickness of the glass plate G to be treated. On the other hand, if the distance is more than 150 mm, spattering of the coating solution tends to be caused upon applying the coating solution onto the glass plate.

The preferred range of 5 mm to 100 mm of the interval between the adjacent needle portions 12, 12 . . . is provided in view of a viscosity of the coating solution to be used and a speed of vaporization of the coating solution after supplying the coating solution onto the glass plate. Further, the reason why the interval between the adjacent needle portions is preferably adjusted to the above range is as follows. When the width "a" of each of the strip-shaped coating portions immediately after being formed on the upper surface of the glass plate by discharging the coating solution from the needle portion lies within the range of 5 mm to 100 mm, the area between the adjacent strip-shaped coating portions which is kept uncoated is narrowed by leveling the strip-shaped coating portions. The strip-shaped coating portions are spread over the entire upper surface of the glass plate to thereby form the coat having a uniform thickness on the entire upper surface of the glass plate G.

Further, it is important that the glass plate to be treated is horizontally arranged. With this horizontal arrangement, it is possible to form the coat having a uniform thickness. Further, it is necessary to set the needle portions in the direction perpendicular to the upper surface of the glass plate. If the needle portions are arranged in an inclined state, it may become difficult to uniformly apply the coating solution on the surface of the glass plate, resulting in occurrence of an uncoated portion to which no coating solution is supplied or unevenness in film thickness of the coat.

Figure 8:
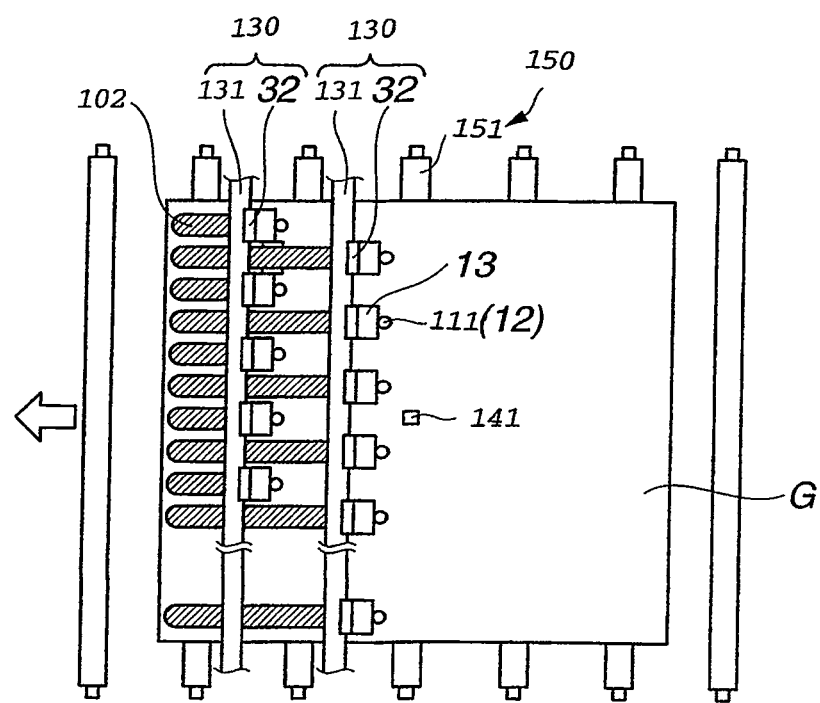
FIG. 8 is a plan view of the application apparatus according to another embodiment in the second aspect of the present invention.

Although the plurality of needle portions 12 are arranged in a row as shown in FIG. 6 and FIG. 7, two rails 131, 131 extending in the width direction of the glass plate may be provided and the plurality of needle portions 12 may be alternately arranged on the two rails 131, 131 in a zigzag manner in the width direction of the glass plate as shown in FIG. 8.

In a case where the interval between the adjacent strip-shaped coating portions is set to narrower than the width of each of the electromagnetic valves, the electromagnetic valves cannot be arranged in a row on one rail as shown in FIG. 6 and FIG. 7. In a case where the electromagnetic valves to which the nozzles are mounted are alternately arranged on the two rails in a zigzag manner in the width direction of the glass plate as shown in FIG. 8, it is possible to reduce the interval between the adjacent needle portions of the nozzles.

Each of the nozzles 111, 111 . . . is associated with a position adjuster 130 including a guide 32 which is disposed to be slidably movable on the rail 131 extending in the width direction of the glass plate (i.e., in the horizontal direction). Each of the electromagnetic valves are fixedly mounted to the guide, so that each of the nozzles 111, 111 . . . is allowed to slidably and adjustably move in the width direction of the glass plate. Further, each of the nozzles 111, 111 . . . is allowed to adjustably move in the height direction along a vertically elongated hole formed in a fitting member that is mounted to the guide.

Further, the leading edge of the glass plate G in the transporting direction is detected by a position detector 140 that is constituted of a sensor 141. The sensor 141 is disposed in a position which is located on an upstream side of and in the vicinity of the plurality of nozzles arranged in a row. The electromagnetic valves are operated to open and start application of the coating solution in an inside position of the glass plate which is located rearward offset from the leading edge of the glass plate in the transporting direction by a length of about ½ of the interval between the adjacent strip-shaped coating portions immediately after being formed on the upper surface of the glass plate by discharging the coating solution from the needle portions 12, 12 . . . , whereas the electromagnetic valves are operated to close and stop application of the coating solution in a position which is located forwardly offset from the rear edge of the glass plate in the transporting direction by substantially the same length as described above, i.e., by about ½ of the above interval. The open and close operation of the electromagnetic valves is controlled by the controller (not shown) so that the coating solution is applied to the upper surface of the glass plate in the manner described above.

Further, after the leading edge of the glass plate G is detected by the sensor 141, the controller (not shown) of the application apparatus 100 controls the timing of opening operation of the respective electromagnetic valves 13, 13 . . . and the timing of closing operation of the respective electromagnetic valves by using the timer or the transportation distance which is set per size of the glass plate G to be treated and previously stored in the controller. Further, the plurality of electromagnetic valves 13, 13 . . . aligned in a row are selectively operated to open and close according to the data previously stored per width of the glass plate G in the controller.

In a case where a transporting roll 151 is operated at a constant transporting speed, the timings of opening and closing operations of the electromagnetic valves also can be adjusted by controlling the timer. However, the transporting speed of the transporting roll may be slightly varied depending upon campaign. In such a case, the transporting distance of the glass plate G is obtained by determining the position of the leading edge of the glass plate G and the position of the rear edge thereof by counting pulses which are generated by a rotary encoder or the like, not shown.

The sensor 141 that detects the leading edge of the glass plate G may be disposed on an upstream side of the positions of the nozzles 111, 111 . . . , such that after the terminal edge (i.e., the rear edge) of the glass plate G is detected by the sensor 141, the electromagnetic valves 13, 13 . . . may be operated to close in a forward position of the glass plate which is located offset by a length of a/4 forwardly (i.e., in an inward direction of the glass plate) from the terminal edge (i.e., the rear edge) of the glass plate G in the transporting direction.

Figure 9:
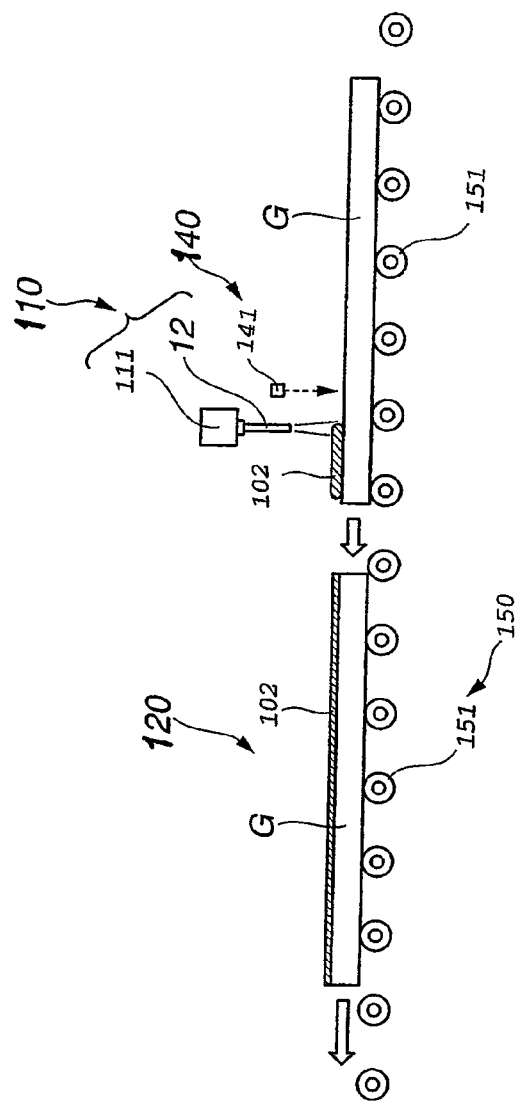
FIG. 9 is a side view of the glass plate for explaining the application apparatus in the second aspect of the present invention.
Figure 10:
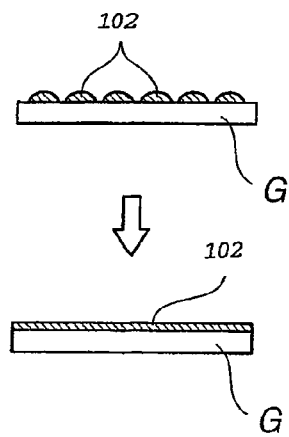
FIG. 10 is a front view of the glass plate for explaining the application apparatus in the second aspect of the present invention.
Figure 11:
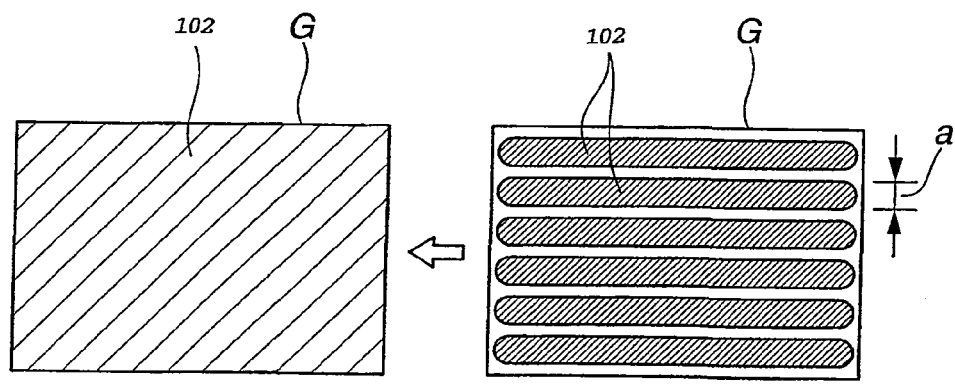
FIG. 11 is a plan view of the glass plate for explaining the application apparatus in the second aspect of the present invention.

As shown in FIG. 9 to FIG. 11, the leveling device 120 may be constructed such that the strip-shaped coating portions 102 applied to the upper surface of the glass plate G are allowed to gradually spread by their own weight during transportation of the glass plate G when reducing the rotating speed of the transporting roll 51 after termination of application of the coating solution. Thus, with the leveling device, the adjacent strip-shaped coating portions 102, 102 . . . may be brought into contact with each other and spread up to marginal portions of the glass plate on the leading edge side and the rear edge side thereof due to fine vibration of the transporting roll 151 rotated at the reduced speed, so that a coat having a uniform thickness may be formed over the entire upper surface of the glass plate G.

Another example of the leveling device 120 may be a fine vibration generator (not shown) which forcibly applies fine vibration to the glass plate G having a plurality of strip-shaped coating portions 102, 102 . . . thereon, which is disposed on the transporting roll 151. For instance, the fine vibration generator may be configured to apply fine vibration to the glass plate by irradiation of ultrasonic wave to thereby facilitate spreading the areas of the strip-shaped coating portions. Alternatively, the fine vibration generator may be mounted to the transporting roll to thereby facilitate spreading the areas of the strip-shaped coating portions.

Although the preferred embodiment according to the second aspect of the present invention is explained above, the present invention is not limited to the preferred embodiment as described above. Modifications and variations of the embodiment described above will be made in accordance with various applications unless departing from the scope of the invention.

The glass plate G is a flat glass plate in this embodiment. However, as the glass plate G, there may also be used, for example, a single plate such as a tempered glass plate, a semi-tempered glass plate and a semi-tempered float glass plate (i.e., a so-called green glass plate), or a laminated glass plate formed by bonding a plurality of tempered glass plates to each other or bonding the tempered glass plate to the green glass plate through an intermediate layer or an injection layer formed of resin such as PVB resin, EVA resin or the like. Further, the apparatus and method according to this embodiment may also be applied to not only the glass plate G but also various kinds of panels such as a resin panel and the like.

The apparatus for coating a coating solution and the method thereof according to the first aspect of the present invention is described in more detail by way of Example 1 by referring to the accompanying drawings.

Example 1

Figure 3:
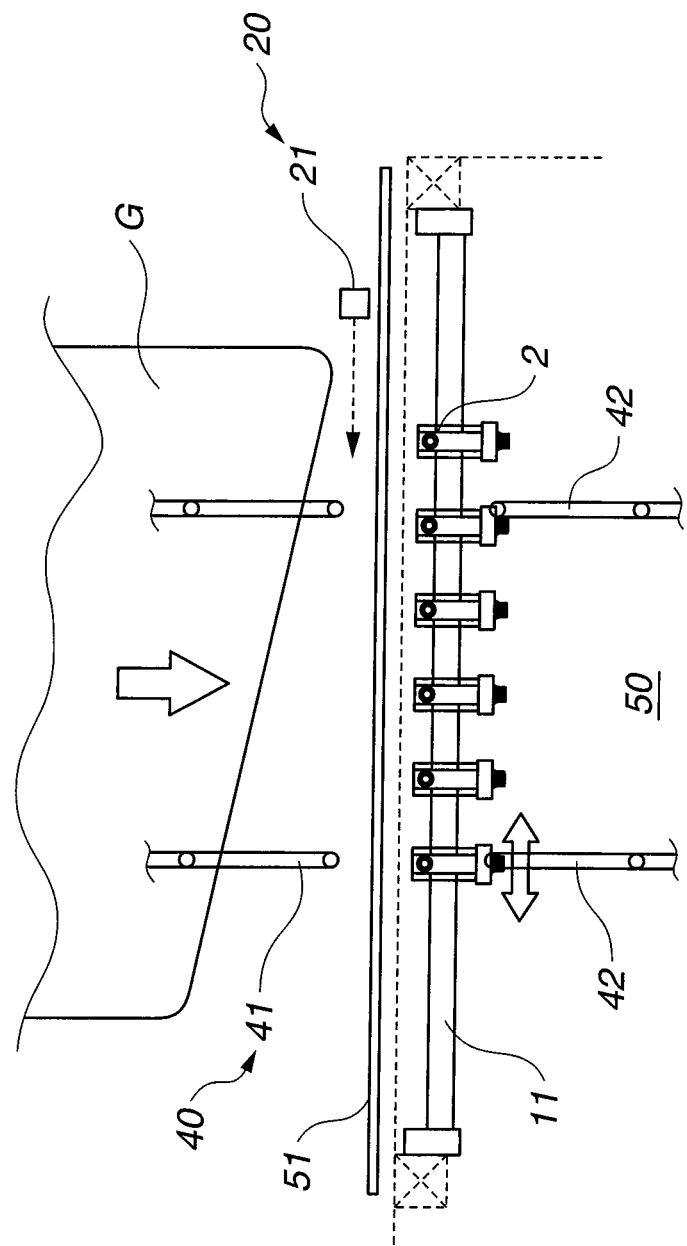
FIG. 3 is a plan view of the application apparatus in the first aspect of the present invention.
Figure 4:
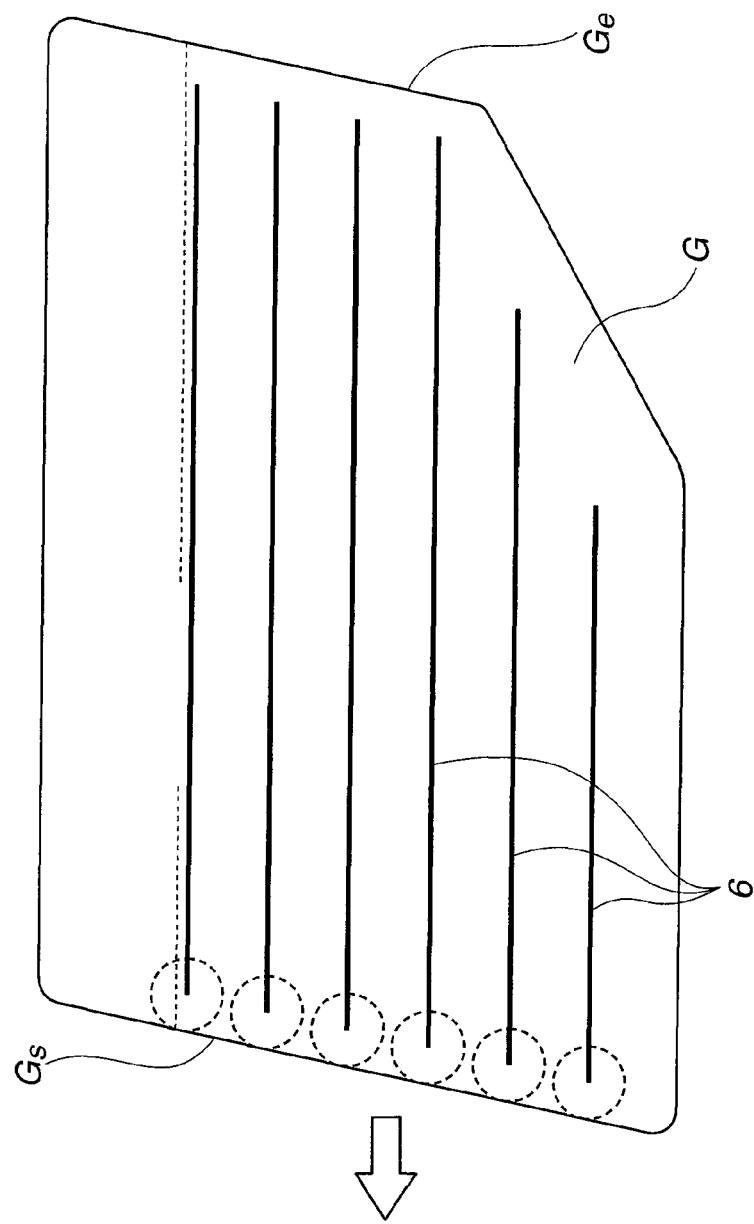
FIG. 4 is a plan view of a glass plate that is used for explaining an application method in the first aspect of the present invention.

As shown in FIG. 2 to FIG. 4, the respective positions of a plurality of coating nozzles in a width direction (i.e., a horizontal direction) of the glass plate G are previously adjusted by the nozzle position adjuster 10 according to a shape of a surface of the glass plate G.

As shown in FIG. 2, the heights of the respective coating nozzles are previously adjusted along the curved surface of glass plate G in the width direction thereof.

As shown in FIG. 1 and FIG. 2, when the glass plate G is transported to the vicinity of the ascent/descent door 51 by the supply conveyer 41 in order to successively introduce the glass plate G into the coating chamber 50, the distal leading edge of the glass plate G is detected by the glass plate G detecting sensor 21 and the ascent/descent door 51 at an inlet of the coating chamber 50 is downwardly moved to an opened state thereof.

When the ascent/descent door 51 is downwardly moved, the solvent tank mounted to a wall surface of the ascent/descent door 51 which faces to an inside of the coating chamber is simultaneously moved downwardly. At this time, the coating nozzles immersed in the solvent within the solvent tank is separated from the solvent tank because the coating nozzles are fixed to not the ascent/descent door 51 but a side of the coating chamber.

When the ascent/descent door 51 is downwardly moved and the glass plate G is introduced into the coating chamber, operation of each of the timers $T_1$-$T_n$ set for the respective coating nozzles 2, 2 . . . is started at the timing at which the glass plate detecting sensor 21 is turned on. As shown in FIG. 5, the set times $t_1$, $t_2$, $t_n$ of the timers $T_1$-$T_n$ are set such that application of the coating solution by the respective coating nozzles 2, 2 . . . is started from an inside position located rearwardly apart from a leading edge Gs of the glass plate G by a preset value, for instance, about 3 cm. While transporting the glass plate G at a constant speed, the coating solution is dropped from the respective coating nozzles to thereby form a plurality of lines of the coating solution 6, 6 . . . which are parallel to each other on the upper surface of the glass plate G.

Further, as shown in FIG. 5, the timers T1'-Tn' provided for stopping supply of the coating solution 6 from the respective coating nozzles at the position of the glass plate G which is offset forwardly from a terminal edge (i.e., a rear edge) Ge of the glass plate G in accordance with the irregular shape of the glass plate G are started. The times t1', t2', tn' for the respective timers T1'-Tn' are set such that application of the coating solution by the respective coating nozzles is stopped in an inside position of the glass plate which is spaced forwardly apart by a preset value of distance, for instance, about 3 cm from the terminal edge (i.e., the rear edge) Ge of the glass plate G. The supply of the coating solution 6 per each coating nozzle 2 is stopped in the above-described inside position of the glass plate.

At a time at which the terminal edge (i.e., the rear edge) of the glass plate G is completely passed through the ascent/descent door 51 and the application of the coating solution 6 by the coating nozzles 2, 2, . . . is stopped, the ascent/descent door 51 is upwardly moved to a closed state thereof.

As explained above, in this Example, the coating solution is not sprayed over an entire upper surface of the glass plate G but is applied to the area of the upper surface of the glass plate G which extends from the inside position offset rearward from the leading edge Gs to the inside position offset forwardly from the terminal edge (i.e., the rear edge) Ge, in the form of a plurality of parallel lines with constant intervals therebetween. As a result, the coating solution 6, 6, . . . can be prevented from wrapping around the edge surface or reaching the underside surface of the glass plate G whereby a coat having a uniform thickness can be formed thereon by using a necessary minimum amount of the coating solution.

In particular, even in a case the coating solution is applied to a concaved portion on an upper surface of a curved glass plate that is recessed at a central portion thereof, the coating solution can be prevented from wrapping around the edge of the glass plate and reaching the underside surface of the glass plate.

In the next step, the parallel lines of the coating solution 6, 6 . . . applied to the upper surface of the glass plate G are spread only over the upper surface of the glass plate G by using a nonwoven fabric (not shown) which is attached to a robot hand (not shown) before the coating solution 6, 6 . . . is dried and solidified. Subsequently, after a predetermined time has elapsed, the spread parallel lines of the coating solution 6, 6 . . . are leveled to thereby form a coat having a uniform thickness on the upper surface of the glass plate G.

If the nonwoven fabric used to spread the coating solution is successively used for the leveling of the next glass plate G, there tends to occur unevenness in coating or traces on the coating portion due to adhesion of the dried and solidified coating solution to the nonwoven fabric. This leads to failure in forming a uniform coat. For this reason, it is preferred to replace the used nonwoven fabric with a new nonwoven fabric every time at which the coating solution is spread.

The apparatus 100 for coating a coating solution according to the second aspect of the present invention is described in more detail by way of Examples 2-4 by referring to the accompanying drawings.

Example 2

As shown in FIG. 6 and FIG. 7, corresponding to the width of the glass plate G held in the predetermined position in the previous step, the mounting positions of the nozzles 111, 111, . . . are adjusted by the fitting members (not shown) therefor which are mounted to the slidably movable guides 32. The guides 32 are so disposed as to slidably move on the rail 131 that is provided in the width direction of the glass plate G (i.e., in the horizontal direction). Further, the plurality of nozzles 111, 111, . . . are selectively used according to the data stored per kind of glass plate G in the controller.

Furthermore, in a case where it is required to adjust the height position of each of the nozzles Mowing to variation in thickness of the glass plate G or the like, the position of each of the nozzles 111 can be adjusted in the height direction, namely, in the up-and-down direction by allowing the nozzle to move along a vertical elongated hole formed in the respective fitting members (not shown) mounted on the guide 32.

As shown in FIG. 6 and FIG. 7, the glass plate G that is held in the predetermined position by a glass plate positioning device (not shown) in the previous step is transported by the transporting roll 151 of a transporting device 150 in order to form coating portions 102 of the coating solution on the glass plate G. When the glass plate G approaches to the vicinity of the nozzles 111, 111, . . . , the glass plate detecting sensor 141 is activated.

At the time at which a predetermined time has elapsed after the leading edge of the glass plate G is detected by the glass plate detecting sensor 141, the leading edge of the glass plate G passes immediately below the nozzles. Subsequently, at the time at which the nozzles are opposed to upstream positions on the upper surface of the glass plate which are located apart by several millimeters from the leading edge of the glass plate G, the plurality of the electromagnetic valves 13 provided corresponding to the selected nozzles 111 are opened to start dropping of the coating solution from the needle portions 12 of the selected nozzles 111.

In a case where the width "a" of the respective strip-shaped coating portions immediately after being formed by discharging the coating solution from the nozzles is set at 24 mm and the pitch between the adjacent nozzles is set at a constant value of 28 mm, the interval between the adjacent strip-shaped coating portions is 4 mm. In this case, the electromagnetic valves 13 are previously set to open such that dropping of the coating solution from the needle portions of the respective nozzles is started from the upstream positions of the glass plate (i.e., on the inside positions of the glass plate) which are located apart by 2 mm equivalent to the length of ½ of the above-described interval from the leading edge of the glass plate. As a result, the parallel linear strip-shaped coating portions 102 are formed as shown in FIG. 10 and FIG. 11.

Next, as shown in FIG. 7, the plurality of nozzles are arranged in parallel in the width direction of the glass plate at a constant pitch of 28 mm, and the width "a" of the respective strip-shaped coating portions immediately after being formed by discharging the coating solution from the needle portions of the respective nozzles is 24 mm. When the glass plate is further transported and the rear edge thereof approaches to the nozzles, the electromagnetic valves corresponding to every nozzles are operated to close and stop dropping of the coating solution from the needle portions in the position which is located forwardly offset by 2 mm equivalent to ½ of the length of the above-described interval from the rear edge of the glass plate in the direction of transporting the glass plate.

After the rear edge of the glass plate G has passed just below the injecting positions of the respective nozzles 111, the glass plate G is transported to a leveling zone. In the leveling zone, the glass plate G is transported at a reduced transporting speed until about 2 minutes have elapsed at a temperature of 24° C. As a result, as shown in FIG. 11, the coating portions are spread over an entire upper surface of the glass plate, thereby forming a defogging or antifogging film on the entire upper surface of the glass plate.

The glass plate is arranged so as to maintain a horizontal state, and the respective needle portions are arranged perpendicular to the upper surface of the glass plate.

The needle portion of each of the nozzles was made of a stainless steel (SUS304) and had an inner diameter of 1.4 mm, an injection pressure of the coating solution therefrom was 0.05 MPa and a flow rate of the coating solution therethrough was 2.2 g/sec. The transporting speed of the glass plate was 0.4 m/sec.

As explained above, in this example, the coating solution was not sprayed over the entire upper surface the glass plate G but was sprayed in the form of a plurality of parallel strip-shaped coating lines at constant intervals therebetween over the area extending from an inside portion of the glass plate G which was located rearward offset from the leading edge of the glass plate G to an inside portion of the glass plate G which was located forwardly offset from the rear edge of the glass plate G. As a result, the coating solution was prevented from wrapping around the edge surface of the glass plate G or reaching the underside surface of the glass plate G. Accordingly, a whole amount, i.e., 100% of the coating solution injected from the nozzles was effectively used, and it was not necessary to collect and recycle the coating solution run down from the upper surface of the glass plate. For this reason, the coating solution was free from absorption of moisture in the air which will be caused in a case where the coating solution is collected and recycled. As a result, it was found that a uniform defogging film was formed on the upper surface of the glass plate without causing deterioration in properties of the defogging film due to the absorption of moisture.

Example 3

As shown in FIG. 8, there were provided two rails 131 for supporting the coating nozzles. The plurality of nozzles 111 were alternately arranged on the two rails 131, 131 in the width direction of the glass plate G so as to form a zigzag pattern. In this case, the timings of starting application of the coating solution by the respective nozzles 111, 111, . . . were set so as to apply the coating solution from predetermined coating positions on the upper surface of the glass plate which are located on a side of the leading edge of the glass plate, by correcting the distance between each of the nozzles and the sensor 141.

With this arrangement of the nozzles, the nozzles could be disposed with intervals therebetween which are smaller than a width of the respective electromagnetic valves.

Example 4

A fine vibration generator which is capable of forcibly applying fine vibration to the glass plate transported on the transporting roll was used as the leveling device. Specifically, an ultrasonic device, not shown, was used to irradiate the strip-shaped coating portions on the upper surface of the glass plate with ultrasonic wave. In this case, after stopping the irradiation of ultrasonic wave, the strip-shaped coating portions were allowed to stand for several seconds. As a result, it was found that spreading of the areas of the strip-shaped coating portions was facilitated.

The invention claimed is:

1. An apparatus for applying a coating solution onto an upper surface of a rectangular glass plate that is transported on a transporting roll in a horizontal direction at a constant speed, the apparatus comprising:
   a plurality of nozzles for supplying the coating solution which are disposed with a predetermined pitch in a width direction of the glass plate perpendicular to a direction of transporting the glass plate;
   a coating solution tank connected to each of the nozzles through a tube;
   an electromagnetic valve disposed between each of the nozzles and the tube, the electromagnetic valve being operative to start and stop supply of the coating solution, each of the nozzles having a needle portion on a tip end portion thereof from which the coating solution is ejected, the needle portions being arranged in a vertical direction perpendicular to the upper surface of the glass plate; and
   a leveling means for leveling strip-shaped coating portions provided on the upper surface of the glass plate that reduces a rotating speed of the transporting roll after the strip-shaped coating portions are provided in parallel to each other at intervals substantially ranging from a/4 to a/30
   wherein "a" is a width of each of the strip-shaped coating portions immediately after application of the coating solution onto the upper surface of the glass plate between the leading edge of the glass plate and the rear edge thereof by ejecting the coating solution from the needle portions to thereby spread areas of the strip-shaped coating portions until a clearance between the strip-shaped coating portions adjacent to each other is eliminated and form a coat having a uniform thickness on the upper surface of the glass plate.

2. The apparatus for applying a coating solution as claimed in claim 1, wherein a portion extending from the coating solution tank to the needle portions of the nozzles has a substantially hermetically sealed structure to shield the portion from moisture of outside air, and the coating solution ejected from the needle portions is prevented from being recirculated and reused.

3. The apparatus for applying a coating solution as claimed in claim 1, wherein the respective needle portions have an inner hole diameter of 0.5 mm to 3.0 mm and a length of 5 mm to 30 mm, a distance from a lower end of the respective needle portions to the upper surface of the glass plate is in the range of 5 mm to 150 mm, and an interval between the adjacent needle portions is in the range of 5 mm to 100 mm.

4. The apparatus for applying a coating solution as claimed in claim 1, wherein the needle portions are alternately arranged in a zigzag manner in the width direction of the glass plate.

5. The apparatus for applying a coating solution as claimed in claim 1, further comprising a position adjusting means for adjustably moving each of the nozzles in the width direction of the glass plate on a rail that extends in the width direction of the glass plate.

6. The apparatus for applying a coating solution as claimed in claim 1, further comprising a position detector that detects the leading edge of the glass plate in the direction of transporting the glass plate, and a controller that is configured to operate the electromagnetic valves to open such that application of the coating solution is started in inside positions on the upper surface of the glass plate which are located rearward offset from the leading edge of the glass plate in the direction of transporting the glass plate by a length of about ½ of the interval between the adjacent strip-shaped coating portions immediately after being formed on the upper surface of the glass plate by ejecting the coating solution from the needle portions, and to operate the electromagnetic valves to close such that application of the coating solution is stopped in positions on the upper surface of the glass plate which are located forwardly offset by substantially the same length as the length of about ½ of the interval from the rear edge of the glass plate in the direction of transporting the glass plate.

7. An apparatus for applying a coating solution onto an upper surface of a rectangular glass plate that is transported on a transporting roll in a horizontal direction at a constant speed, the apparatus comprising:
   a plurality of nozzles for supplying the coating solution which are disposed with a predetermined pitch in a width direction of the glass plate perpendicular to a direction of transporting the glass plate;
   a coating solution tank connected to each of the nozzles through a tube;
   an electromagnetic valve disposed between each of the nozzles and the tube, the electromagnetic valve being operative to start and stop supply of the coating solution, each of the nozzles having a needle portion on a tip end portion thereof from which the coating solution is ejected, the needle portions being arranged in a vertical direction perpendicular to the upper surface of the glass plate; and
   a leveling means for leveling strip-shaped coating portions provided on the upper surface of the glass plate while transporting the glass plate after the strip-shaped coating portions are provided in parallel to each other at intervals substantially ranging from a/4 to a/30
   wherein the leveling means comprises a fine vibration applying means for forcibly applying fine vibration to the glass plate on the transporting roll, the fine vibration applying means comprising a mechanical vibration means or an ultrasonic wave vibration means which is so constructed as to facilitate spreading the areas of the strip-shaped coating portions, and
   wherein "a" is a width of each of the strip-shaped coating portions immediately after application of the coating solution onto the upper surface of the glass plate between the leading edge of the glass plate and the rear edge thereof by ejecting the coating solution from the needle portions to thereby spread areas of the strip-shaped coating portions until a clearance between the strip-shaped coating portions adjacent to each other is eliminated and form a coat having a uniform thickness on the upper surface of the glass plate.

* * * * *